Jan. 16, 1951 P. H. TAYLOR ET AL 2,538,602
AIRCRAFT CONTROL MECHANISM
Filed July 20, 1945 3 Sheets-Sheet 3
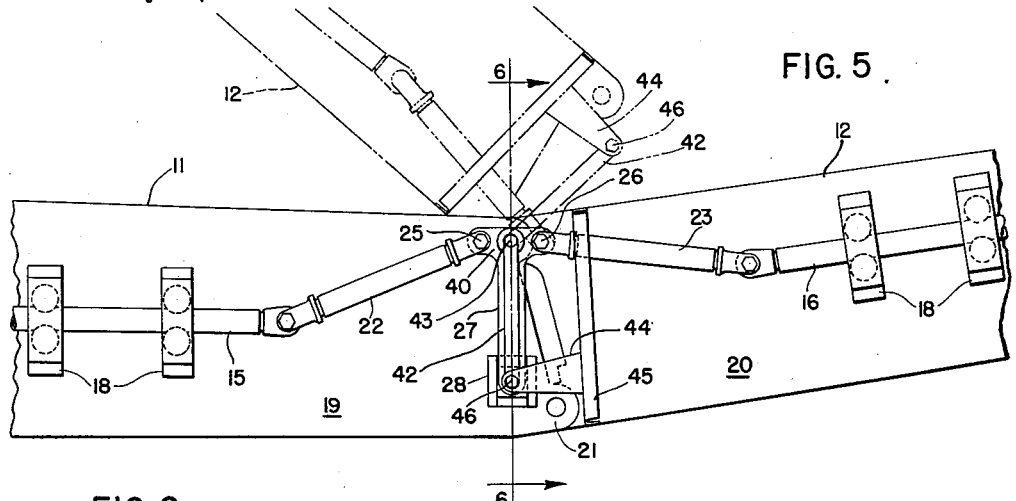
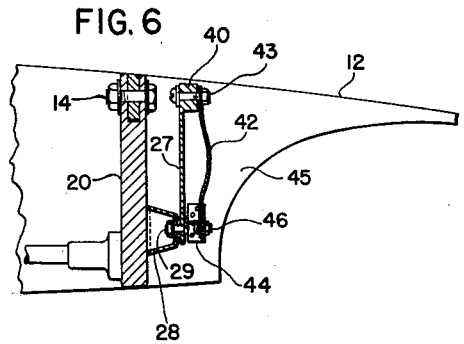
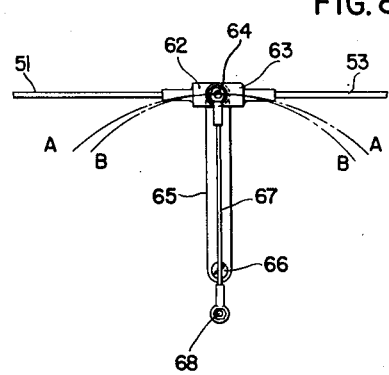
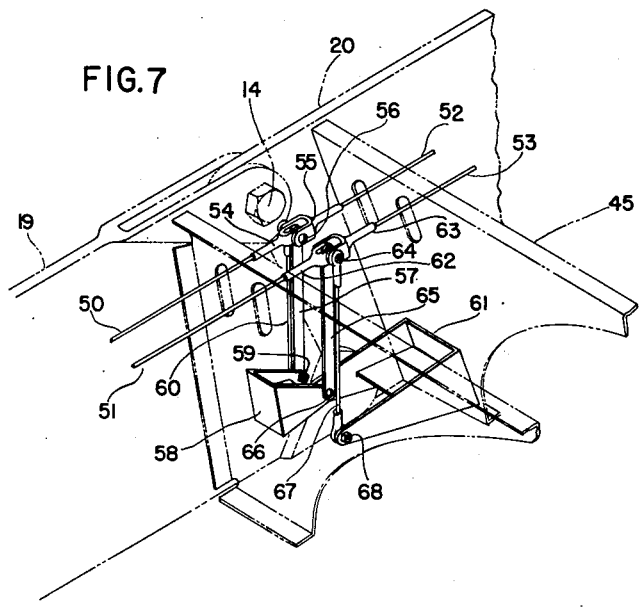
INVENTOR.
PAUL H. TAYLOR
RICHARD E. KARNUTH
BY George F. Goodyear
ATTORNEY Patented Jan. 16, 1951

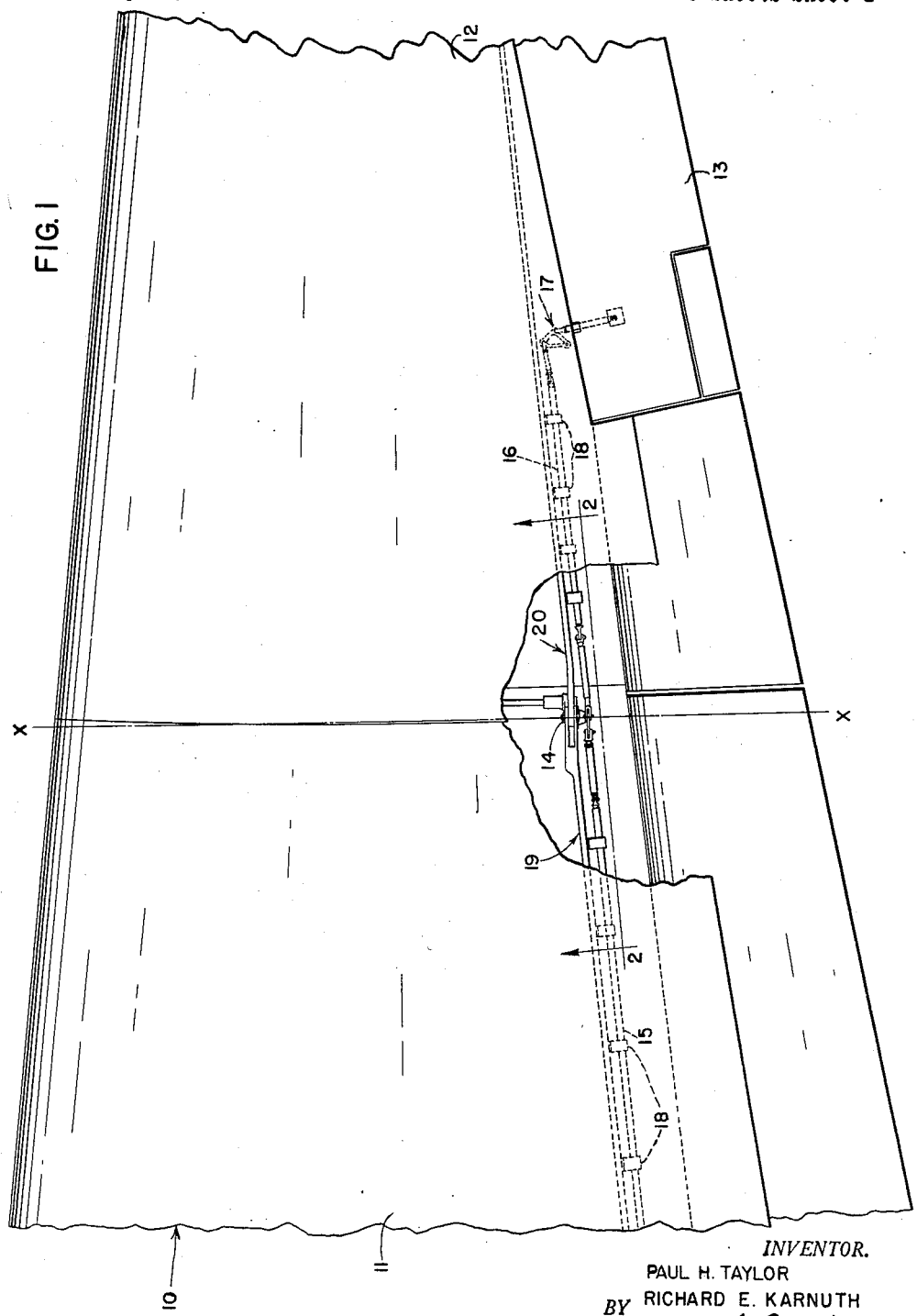

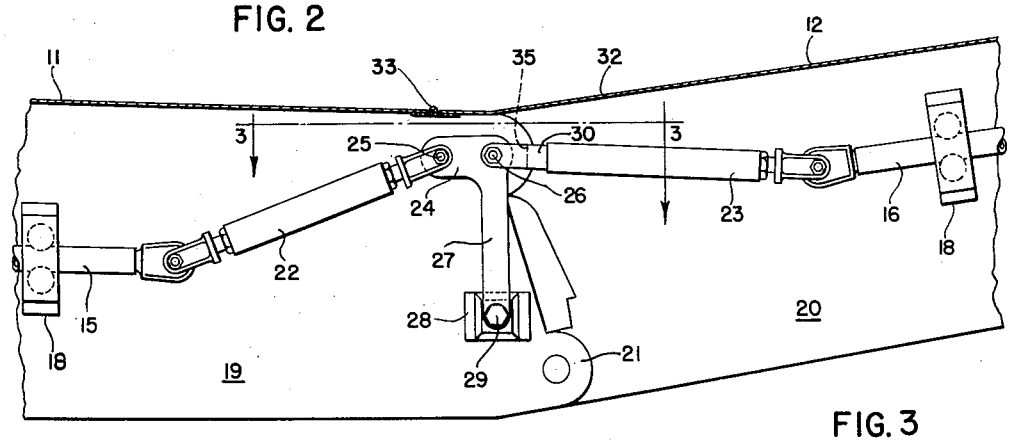
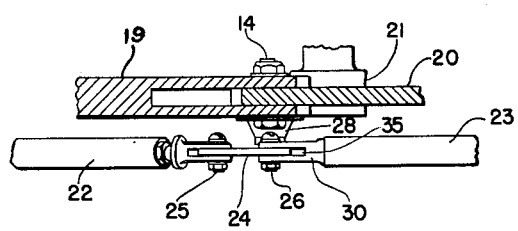
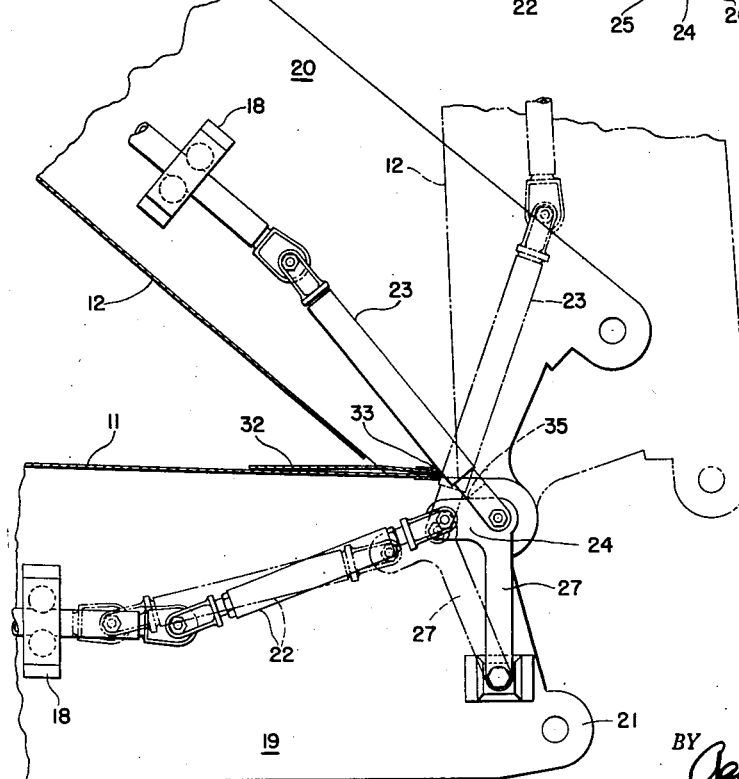

2,538,602

UNITED STATES PATENT OFFICE 2,538,602

AIRCRAFT CONTROL MECHANISM

Paul H. Taylor, North Tonawanda, and Richard E. Karnuth, Buffalo, N. Y., assignors to Curtiss-Wright Corporation, a corporation of Delaware Application July 20, 1945, Serial No. 606,260

3 Claims. (Cl. 244—90)

The present invention relates generally to aircraft having foldable structural parts and is particularly concerned with the arrangement and disposition of the aileron actuating system for folding action upon folding of the wing or other structural part.

Heretofore little serious attention has been paid to the construction, disposition and operating function of the aileron actuating system when applied to an aircraft having folding wings. Usually it is deemed entirely satisfactory to dispose the actuating system within such a wing so that as the wing folds the system naturally slackens sufficiently to allow for the folding action without straining any of its parts or binding at the wing hinge. Service experience with aircraft arranged in this manner shows that the aileron surfaces have a considerable degree of movement and that turbulent air induces buffeting of the controls and causes damage. The same detrimental conditions are present in foldable wing arrangements where the aileron control systems are constructed for complete disconnection.

It is an object, therefore, of this invention to improve on the prior arrangements for aileron and other control systems utilized in foldable aircraft structure and thus prevent control surface damage due to buffeting in turbulent air or for other reasons.

It is an object also to provide novel and useful folding means for aileron or other control systems which will be compact and hence adaptable for any of the various aircraft folding constructions which can be arranged in a variety of configurations for use, for example, with deep section wings or the thin section, high speed laminar flow wing, and which will require the least possible space for its incorporation.

This invention has as another of its objects the provision of simple working means for establishing a fold axis in the control system which is correlated with the structure fold axis for smooth operation, and in which the control system as well as the control surfaces are automatically brought into a normal neutral position.

In carrying out the foregoing object it is also an object to utilize the control folding means as the agency for not only neutralizing the system but for securing or immobilizing the same when the aircraft structural parts are folded, thus effectively preventing surface movement or buffeting.

Further objects and advantages will be pointed out in the detailed description of the several forms of the invention which have been disclosed in the accompanying drawing, in which:

Figure 1 is a fragmentary top plan view of an aircraft wing of folding type in which the aileron control system is shown as including means for permitting the same to fold with the wing, Figure 2 is an enlarged sectional elevational view of only so much of the wing structure and control system as will illustrate one form of the invention, the view being taken at line 2—2 of Figure 1, Figure 3 is a sectional detail in plan of the means shown in Figure 2 and as seen along line 3—3 thereof, Figure 4 is a view similar to that of Figure 2 but in which the folding operation of the means has been shown to advantage.

Figure 5 is another sectional elevational view through a foldable wing showing a somewhat modified aileron control system folding means, Figure 6 is a further transverse sectional detail of the modified means as seen along line 6—6 in Figure 5, Figure 7 is still another form of the invention shown in perspective and illustrating its application to a cable system for aileron control, and Figure 8 is an elevational detail view of only the folding means for the aileron system shown in Figure 7 whereby its operation may be illustrated to best advantage.

The present invention is adapted for use with a foldable structure, for example an aircraft wing such as that shown at 10 in Figure 1. The wing includes a fixed portion 11, a foldable portion 12 which folds about the axis X—X, an aileron control surface 13 and a two part beam structure which is hinged at the means 14 lying in the fold axis. The wing also carries an aileron control system which comprises a first part 15 in the fixed or stationary wing, a second part 16 in the foldable wing portion, the usual bell crank mechanism 17 for effecting aileron movement and a system of link means for rendering the control system foldable, the latter means being indicated only generally in this view at the zone of the wing fold axis.

It will be observed that in Figure 1 the aileron control system is illustrated as a push-pull system embodying a tubular rod construction carried in a plurality of guide elements 18 which are conveniently attached to the two parts 19 and 20 of the rear spar. However, the push-pull tube system shown is not to be taken as limiting the invention as it is possible to incorporate the desired folding means in a cable system as will presently appear.

Turning now to Figures 2, 3 and 4, a particularly useful form of the invention is illustrated in connection with the application of a push-pull aileron control system in which the fixed wing portion 11 carries one part 15 and the foldable wing portion 12 carries the other part 16. The wing spar which supports the two parts of the push-pull system in roller guides 18 is split into sections 19 and 20 which are hinged at the bolt 14 (Figure 3) near the upper edge and releasably connected at the ear or appertures boss 21 near the lower edge thereof. The two parts of the aileron system are interconnected by foldable means which includes a connector link 22 pivoted to tubular member 15, a connector link 23 pivoted to member 16 and an interposed element or means 24 having a pivot connection with link 22 at 25 and a pivot connection with link 23 at 26. The means 24 is supported by, and is an integral part of, a radius link 27, the latter being mounted at its lower end on the wing spar and preferably on the stationary portion 19 thereof as by means of a bracket 28 and pivot pin 29. The radius link 27 is so related to the means 24 as to cause the pivot axis of pin 26 to move in an arcuate path which is normal to the wing hinge axis X—X. Furthermore, the axes of the means 14 and the pin 26 are caused to move into substantial coincidence when the aileron control system is at its neutral position. It will be further noted that the link 23 has a bifurcated end fitting 30 by which it is connected to and embraces the means 24 for a purpose later appearing.

As is usual with folding wing structures the upper skin surface is cut out at the zone of the hinge and a foldable door or panel 32 mounted for movement about a hinge 33. Thus as the movable wing portion 12 folds inwardly and over the stationary portion 11, the door 32 may be caused to fold ahead thereof by suitable means (not shown) to provide for the free movement of the foldable spar 20.

In Figure 4 the above described system is illustrated in its folded position by full lines and in a partially folded position by broken lines. For the purpose of describing the operation and the function of the present system it will be assumed that the aileron is initially in a displaced position which will account for the pivotal displacement of radius link 27 toward the left in this view (broken line position). Thus as the wing portion 12 folds about its axis X—X the link 23 will pivot about its axis at element 26, but the aileron system will not move appreciably from its displaced condition. Finally a fold position will be reached, corresponding to that shown by broken lines when the link 23 will strike against the hinge 33 of door 32, and for further wing folding movement the hinge 33 will act as a fulcrum against which the control link 23 can react to pry the aileron control part 15 toward neutral so that the radius link 27 swings into the full line position. Accordingly, the wing fold axis and the axis of pin 26 are brought into substantial coincidence. Thereafter, the aileron 13 and its control system are retained against movement as the line of action of the two parts of the system are working against each other.

It will also be clear that if the aileron system is displaced in the opposite direction so that the radius link 27 is displaced to the right (opposite that shown in Figure 4 by broken lines) upon wing folding movement a point will be reached in the angular relation between the link 23 and the means 24 when the edge 35 of the bifurcated fitting 30 will strike the upper edge of the means 24 (Figure 4) and further relative angular motion will be prevented. It follows that continued wing folding motion will then force the locked link 23 and means 24 to drag the aileron system toward a neutral position until the same condition is attained as that shown in full line in Figure 4.

There has been provided an aileron control system of folding type which will function automatically to center the system and lock it against further motion. The aileron surface will not then react to turbulent air currents and be buffeted. Moreover, the presently described system will function smoothly and positively if only one wing folds at a time. It is believed that this latter feature is new when applied in a system of the character here presented. The locking action for either aileron system will, through the stick system (not shown), serve to lock both ailerons.

A modification of the above described system is shown in Figures 5 and 6, in which the means 40, corresponding to means 24 in Figure 2, is carried at its mid point on the radius link 27 and the links 22 and 23 are pivoted to it at points 25 and 26. The radius link 27 is pivoted at its lower end on a bracket 28 by pin 29 as previously described. In this form of the invention the neutralizing and locking of the aileron system is accomplished by a control link 42 pivoted at means 40 on pin 43. The control link 42 is also pivoted at its lower end to a bracket 44 fixed on the movable wing portion 12 as by attachment to an adjacent rib structure 45. The pivot axis of the pin element 46 carried in the bracket for the link 42 is positioned in coincidence with the pivot 29 when the wing is unfolded. Thus for normal aileron control the links 27 and 42 swing in unison about a common axis and the pivot point 43 on means 40 then moves to either side of a position of coincidence with the wing hinge axis.

Regardless of which way the aileron system has been displaced, upon folding of the wing portion 12, the pivot pins 29 and 46 will move out of coincidence and control link 42 will pivot about the upper pin 43. In so doing the links 27 and 42 will, through their pivot points 29, 43 and 46 form an isosceles triangle which will effectively lock the aileron system against movement. Further, as the control link 42 starts to move divergently with respect to radius link 27 it will act as a drag or push link, depending on the displacement of the link 27 to the left or right, respectively, of the neutral position as shown, to return the link 27 to neutral and centralize the whole system. This latter action will be understood when it is remembered that the control link 42 must, upon wing folding movement, follow an arcuate path intersecting the wing fold axis. On the other hand link 27 moves along an arcuate path which diverges or is different from that for link 42 but it too intersects the wing fold axis. Accordingly, there is only one point on each of these arcs described by links 27 and 42 which is common and that falls in the wing fold axis.

From the geometry of the system shown in Figure 5 it can be appreciated that during the initial diverging motion of link 42 relative to link 27, when the wing begins to fold, high loads will develop in link 42. To care for such high loads link 42 is made of resilient material such as spring steel and is initially bowed (Figure 6) to allow for a certain degree of yielding until the high loads are reduced. The resiliency of this control link contributes to the smoothness of operation of the folding means for the aileron system.

A still further form of this invention is illustrated in Figures 7 and 8 as the same could be applied in a cable system for controlling aileron motion. In this embodiment the aileron system carried by the stationary wing portion includes a pair of cables 50 and 51 while the system part on the movable wing includes corresponding cables 52 and 53. The cables 50 and 52 are pivotally interconnected by means 54 and 55 which, although similar in function to means 24 or 40 of the previously described systems, are cable end fittings of the usual clevis type pin connected at 56. The fittings are pivotally carried by a radius link 57 in turn mounted on a fixed bracket 58 by pin 59. A control cable element 60 is also pivotally connected at the clevis means and to a second bracket 61 carried by the foldable wing part. The lower pivot connection for cable element 60 (not shown) is not in coincidence with the pivot axis of pin 59 but on the other hand the radius distance for the cable element is greater than for link 57 as will presently appear.

The cables 51 and 53, like the above described assembly, are pivotally interconnected by means 62 and 63 at pin 64 and a radius link 65 connected at 64 is also mounted to the fixed bracket 58 by pivot pin 66. In addition, a control cable element 67 is mounted between the pin 64 and the pivot pin 68 in bracket 61 on the rib 45 of movable wing portion 12.

The operation of this last described means is similar to that for the means of Figures 5 and 6 except that the cable elements 60 and 67 are only effective in tension. With the wing extended, the element 67 (Figure 8) will tend to swing along an arc A—A but since the fixed length link 65 defines an arc B—B which is of lesser radius, the cable will slacken when displaced to either side of neutral. This same slack condition will occur during the initial motion of the wing when folding so that the high loads cannot be picked up by the cable elements. Nevertheless, one or the other of the cable elements 60 and 67 will act in tension to centralize the aileron system during the wing folding operation and will also prevent aileron buffeting in turbulent air.

It will now be observed that the underlying characteristics of the foldable operating organization for the aileron control system comprise means interconnecting the two parts of the system for normal control surface movement as well as for establishing a folding axis which bears a predetermined relationship with the wing fold axis. The interconnecting means is constrained to move in an arcuate path by means of a radius link carried on the stationary wing portion, the arcuate path being directed normally to the wing fold axis. In addition, a control link is included in the organization for the purpose of causing the aileron control system to return to a substantially neutral position upon folding of the wing, and for the purpose of locking or immobilizing the system so that the aileron will not be subject to buffeting in the event the aircraft is parked in the open.

These characteristics have, by way of example only, been disclosed in a number of useful forms, but it should be understood that modifications and rearrangements may be made herein without departing from the spirit and intended scope of the invention as defined hereinafter by the annexed claims.

What is claimed is:

1. In a folding aircraft structure including first and second sections relatively movable about a fold axis, a control system extending between said sections and adapted for substantially linear movement re'ative thereto in the unfolded position, an element pivoted to said first section at a point spaced from said fold axis, linearly movable parts of said control system that extends from both of said sections having pivotal connections to said element, and means for moving said element to bring said pivotal connections into predetermined relation with said fold axis upon fo'ding of said sections, said means comprising interabutting portions of one of said sections and one of said parts.

2. In a folding aircraft structure including first and second sections relatively movable about a fold axis, a control system extending between said sections and adapted for substantially linear movement relative thereto in the unfolded position, an element pivoted to said first section at a point spaced from said fold axis, linearly movable parts of said control system that extends from both of said sections having pivotal connections to said element, and means for moving said element to bring said pivotal connections into predetermined relation with said fold axis upon folding of said sections, said means comprising interabutting portions of said element and one of said parts.

3. In an aircraft provided with a folding wing having a fixed inner section and an outer section movable relative thereto about a wing fold axis, a control system extending between said sections and including a substantially linearly movable part extending from each section, an arm pivoted to said inner section for swinging movement upon an axis spaced from said wing fold axis, said arm being pivotally connected to the adjacent ends of both of said substantially linearly movable parts to provide for the transmission of motion therebetween and to provide a control system fold axis that is movable in an arcuate path into coincidence with the wing fold axis upon swinging movement of the arm, and means responsive to folding of said outer section to effect such coincidence, said means comprising interabutting portions of said arm and one of said parts and interabutting portions of said fixed wing section and one of said parts.

PAUL H. TAYLOR.
RICHARD E. KARNUTH.

REFERENCES CITED

The following references are of record in the file of this patent:

UNITED STATES PATENTS

| Number | Name | Date |
| --- | --- | --- |
| 2,044,357 | Kerr | June 16, 1936 |

FOREIGN PATENTS

| Number | Country | Date |
| --- | --- | --- |
| 524,864 | Great Britain | Aug. 16, 1940 |
| 674,938 | Germany | Apr. 26, 1939 |